April 7, 1959

L. H. WHEELER ET AL 2,880,892

MATERIAL TRANSFER AND STORAGE

Filed Dec. 29, 1955

INVENTORS
LIONEL H. WHEELER
RICHARD B. ROBERTSON
BY
Murray Robinson
THEIR ATTORNEY April 7, 1959

L. H. WHEELER ET AL 2,880,892

MATERIAL TRANSFER AND STORAGE

Filed Dec. 29, 1955

INVENTORS
LIONEL H WHEELER
RICHARD B ROBERTSON
BY
Murray Robinson
THEIR ATTORNEY April 7, 1959　　L. H. WHEELER ET AL　　2,880,892
MATERIAL TRANSFER AND STORAGE
Filed Dec. 29, 1955　　7 Sheets-Sheet 5

INVENTORS
LIONEL H WHEELER
BY RICHARD H ROBERTSON
Murray Robinson
THEIR ATTORNEY.

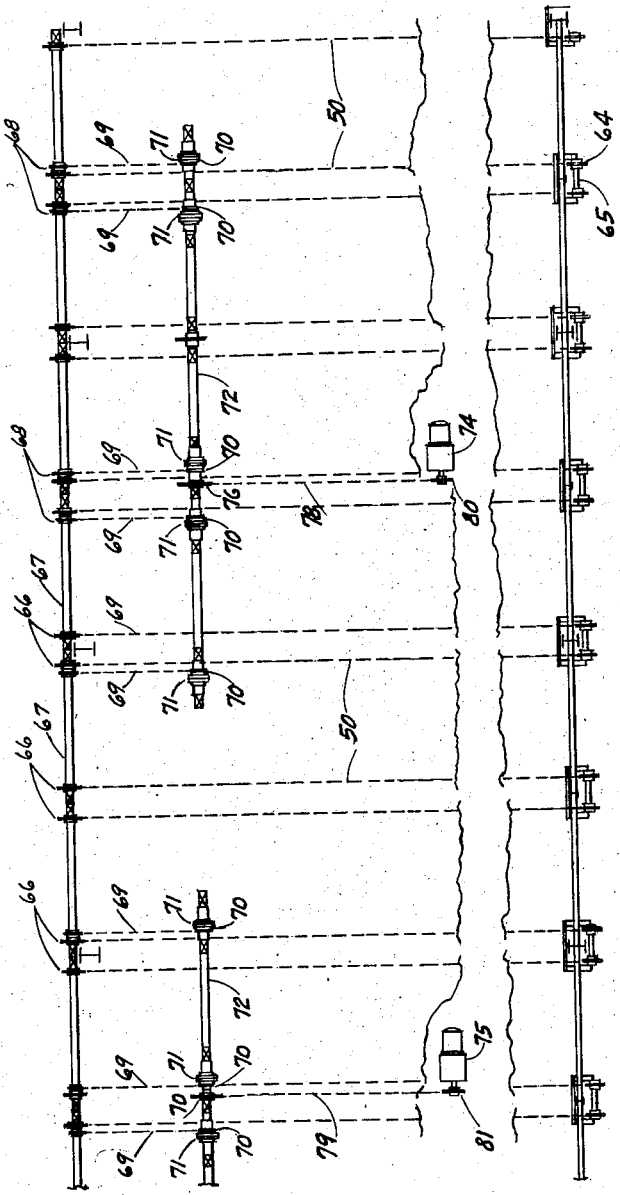

United States Patent Office 2,880,892
Patented Apr. 7, 1959

2,880,892

MATERIAL TRANSFER AND STORAGE

Lionel H. Wheeler and Richard B. Robertson, Houston, Tex., assignors to H. E. Bovay, Jr., Consulting Engineers, Houston, Tex., a partnership Application December 29, 1955, Serial No. 556,183

10 Claims. (Cl. 214—17)

This invention pertains to material transfer and more especially to the transfer of fragmented wood such as sawdust or hog grind, for example, from a source such as a saw or hog to a power station where the wood fragments are fed as fuel to the power station furnace. In particular, the invention concerns the storage bin or fuel vault necessarily disposed between the source and the furnace to match the usually continuous and steadier requirements of the power station for fuel to the usually intermittent and fluctuating output of the hog or saw.

Fragmented wood is a difficult material to handle in storage because the resins melt and run out and cement the wood particles into a solid mass. Several difficulties arise from this cause. First of all, the conveyor used to remove the material from the storage bin may be unable to start again after an idle period, the wood material forming an integrated mass around the conveyor during the idle period and completely blocking it. Or if the drive means for the conveyor is powerful enough it may cause only part of the conveyor to move, breaking it loose from the remainder held fast by the wood material. If the conveyor is successful in getting started without overloading the drive means or breaking off part of the conveyor, it may occur that after a period of operation the conveyor will have removed all material adjacent thereto, the material forming bridges over the top of the conveyor which is left inoperative in an empty tunnel. Finally, if the conveyor is successful in moving the material it tends to move the whole pile forward to the front end of the vault imposing excessive loads on the front wall of the vault and also encouraging the commencement of bridging starting from the front of the vault and working back.

All of the above difficulties increase as the size of the storage bin increases both in area and height. Increase in area increases the conveyor load and increase of height causes the sawdust to pack more tightly and causes the resin to melt and flow more rapidly. In a fuel vault or storage bin 50 by 100 feet in plan and 50 feet high these difficulties become very acute. It is the particular object of the invention to provide a material transfer method and apparatus in which the foregoing difficulties will be overcome. While these difficulties are particularly noticeable in connection with handling fragmented wood, similar problems occur with other materials and the apparatus and method of the invention by which these difficulties are overcome will be useful in handling other materials.

Other objects and advantages of the invention will become apparent from the following description of a preferred embodiment of the invention.

According to the invention bridging is obviated by using a plurality of conveyors side by side. When one conveyor forms a tunnel it is stopped and one next to it is run which destroys support for the bridge over the adjoining conveyor. In addition, the conveyors are run uphill at such an angle that the natural tendency of gravity to shift the material downhill overcomes the tendency of the conveyor to carry the material to the front of the vault where it would gain added support and be additionally compacted. The prevention of the shifting of the pile of material up against the front wall also reduces the load on the front wall of the vault and prevents excessive load on the conveyor that might otherwise result due to compacting of the material at the front of the vault. Transverse bars or plates above the conveyor near the front wall are also provided to help prevent the pile from shifting forward and to take some of the load to the extent the pile does shift forward.

The problem of starting the conveyor after it has been idle is solved by using wedge shaped drag bars which slide directly on the vault floor and which are driven by chains that are protected by shields or plates lying over their tops. The shields keep the material from interlocking with the chains, and the wedged shaped drag bars are able to drive beneath the integrated pile of material and break it up.

For a further and more detailed description of the invention reference will now be made to the accompanying drawings wherein:

Figure 9 is a plan view of the drive means for the floor conveyors;

Figure 1:
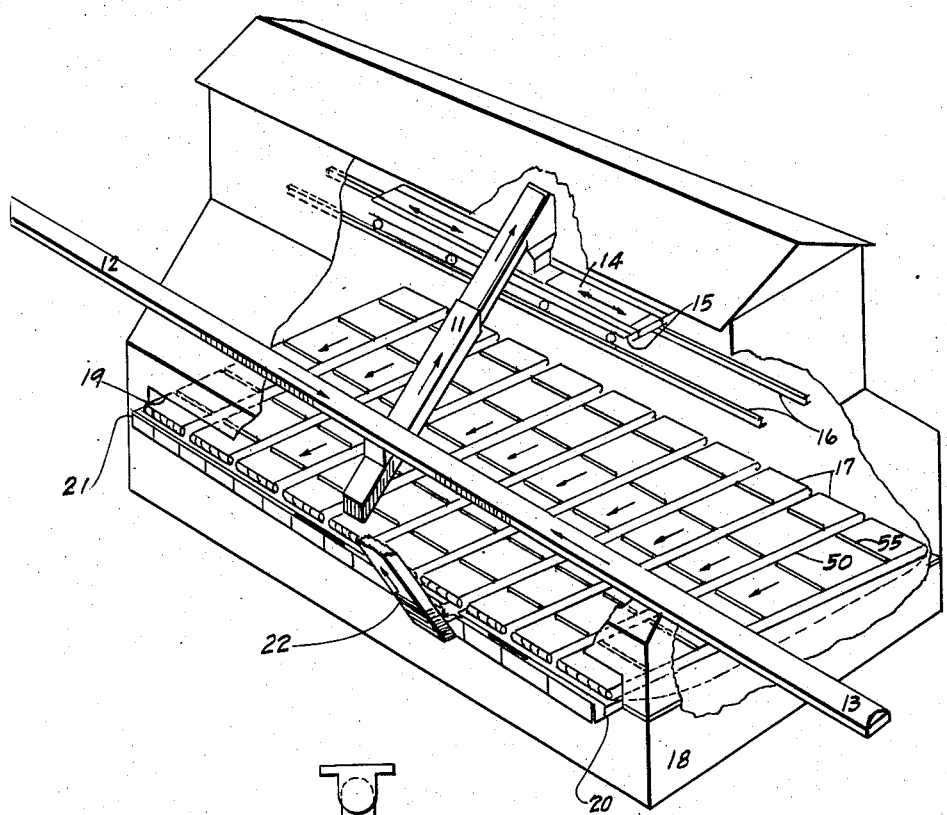
Figure 1 is a perspective of a fuel vault embodying the invention, partly broken away to show the interior thereof.
Figure 2:
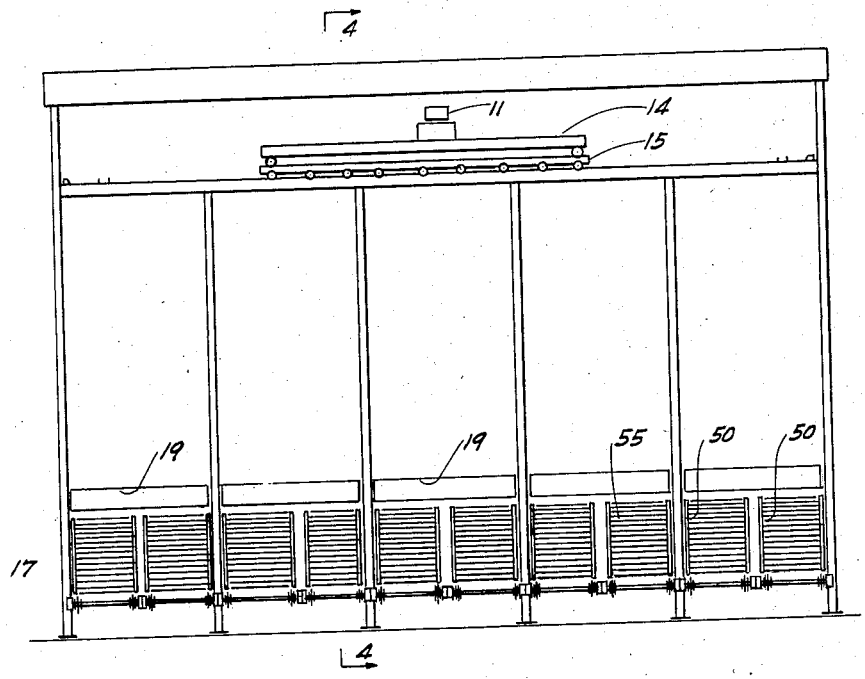
Figure 2 is a rear view of the fuel vault, the back wall being omitted to show the interior.
Figure 3:
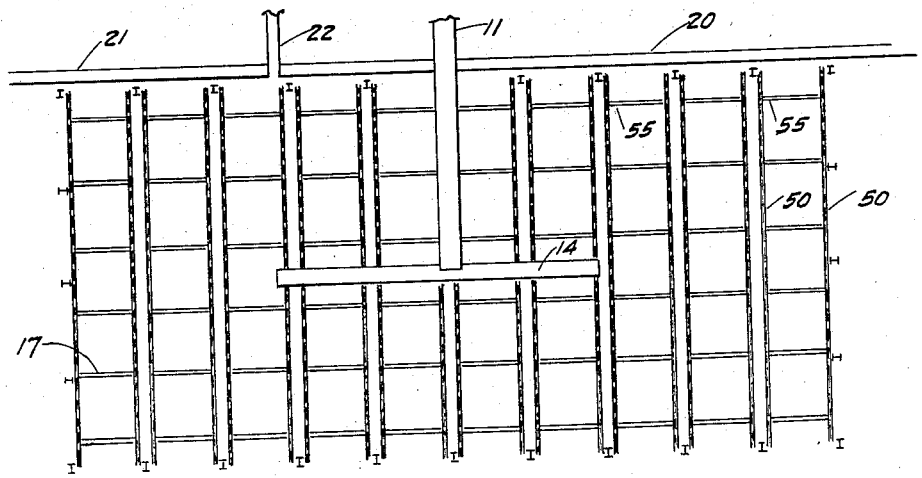
Figure 3 is a semi-schematic plan view of the conveyor system of the fuel vault shown in Figures 1 and 2.

Referring first to Figures 1–3, there is shown a fuel vault including a conveyor 11, preferably is of the continuous chain and drag bar type, which receives wood fragments directly or indirectly from the hog, sawmill, planing mill, or the like, via conveyors 12 and 13, and delivers it to a shuttle conveyor. The latter comprises a reversing continuous belt type conveyor 14 mounted on a wheeled truck 15 which oscillates back and forth on track 16. The shuttle conveyor moves over the top of a plurality of conveyors 17 on the floor of a generally rectangular storage bin 18. Conveyors 17 discharge through openings 19 in the front wall of the bin 18 onto collection conveyors 20, 21 which in turn discharge to a flight conveyor 22.

Figure 4:
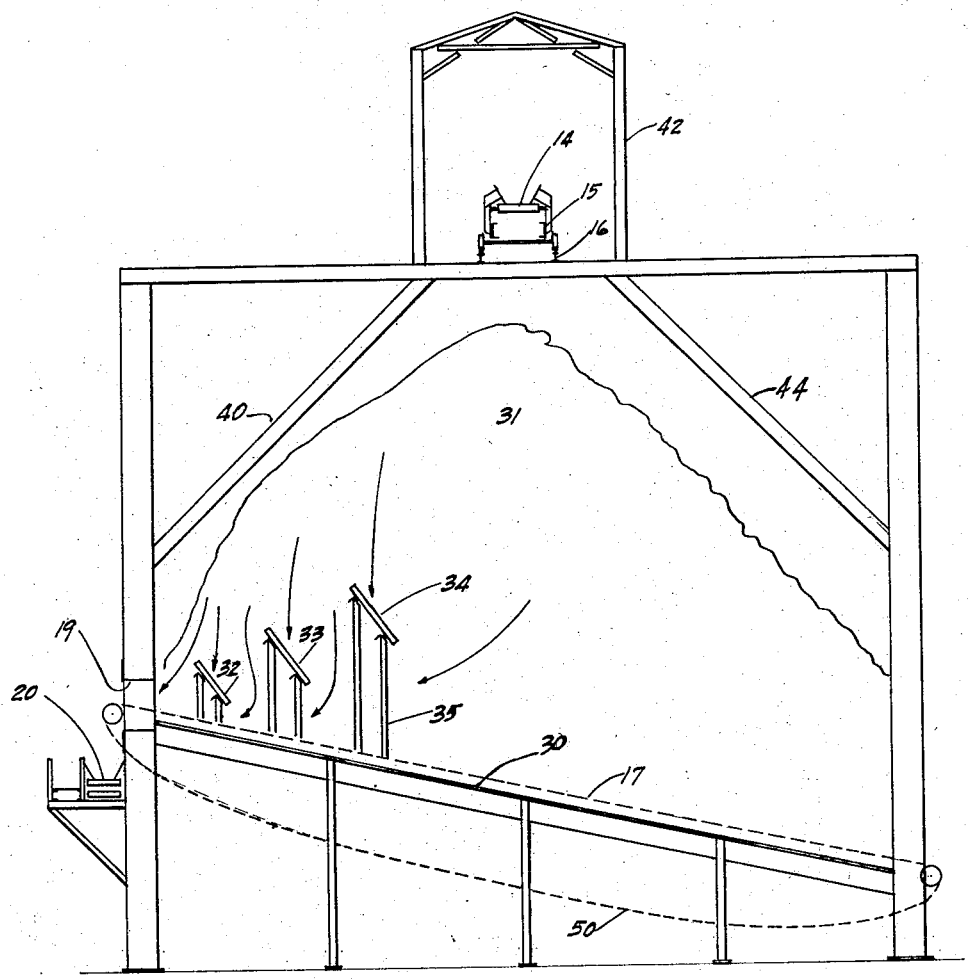
Figure 4 is a section on line 4—4 of Figure 2.

As shown in Figure 4, the floor 30 of the bin slopes upward toward the front of the fuel vault so that the force of gravity tends to move the pile toward the back of the vault. This counteracts the tendency of the conveyors 17 to move the pile toward the front of the vault which would jam the pile against the front wall causing it to compact and also to clog up the openings 19. As a further measure to counteract forward movement of the pile there are provided a plurality of baffles 32, 33, 34 horizontally and vertically spaced apart so as not to form a solid wall and so as to extend their action over a larger volume of the pile. The baffles, like the floor 30, slope upwardly toward the front of the bin so as to employ the force of gravity to tend to prevent forward motion of the pile. Such forward motion parts of the pile as may occur adjacent the baffles causes the pile to be sheared by the baffles and hence broken up, which facilitates rearward motion of parts of the pile under the action of gravity. The arrows on the drawing, Figure 4, indicate motion of the material in the pile showing how downwardly moving parts are deflected by the baffles toward the rear, while forwardly moving parts are broken up and caused to drop to the bin floor. As shown in the drawing, the baffles are mounted on studs 35 to interfere as little as possible with the flow of material underneath on the bin floor.

The roof of the bin comprises two sloping sections 40, 44 to the front and rear respectively of the covered alley 42 over the shuttle conveyor at the middle of the bin. The sloping roof corresponds roughly to the shape of the pile 31 formed by discharge from the shuttle conveyor.

Figure 5:
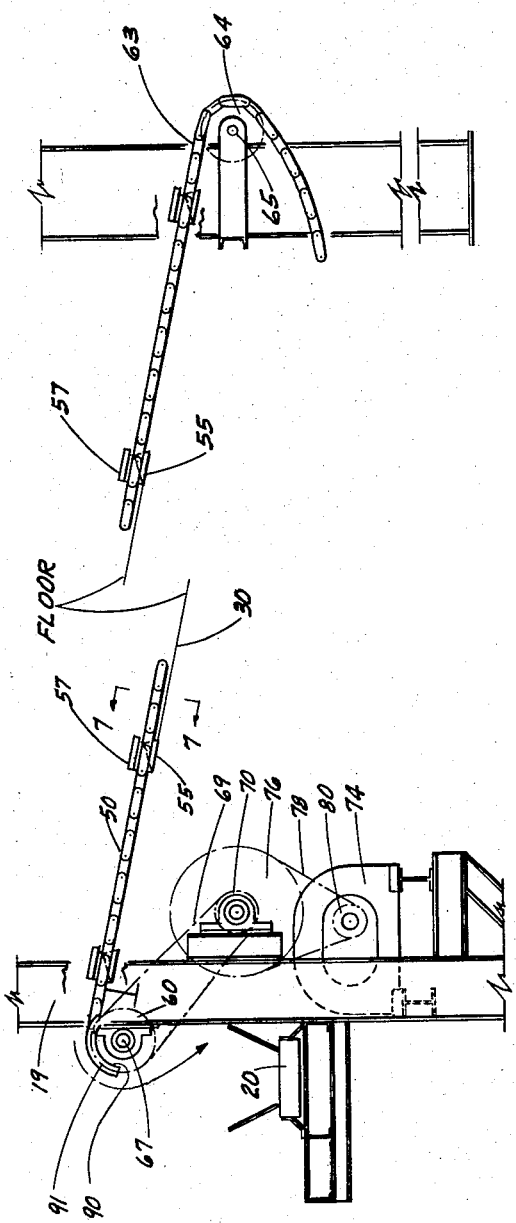
Figure 5 is a section similar to Figure 4 but to a larger scale showing the detail of a floor conveyor.
Figure 6:
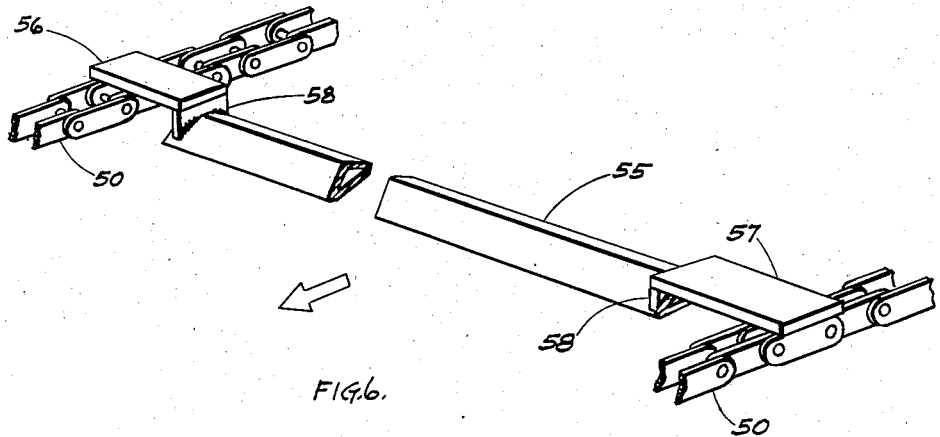
Figure 6 is an isometric view showing a portion of the floor conveyor of Figure 5.
Figure 8:
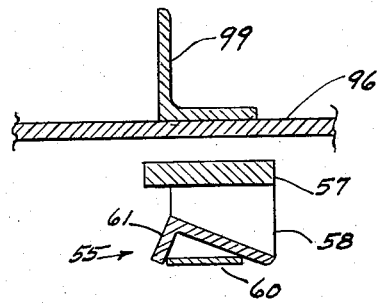
Figure 8 is a section on line 8—8 of Figure 7.
Figure 7:
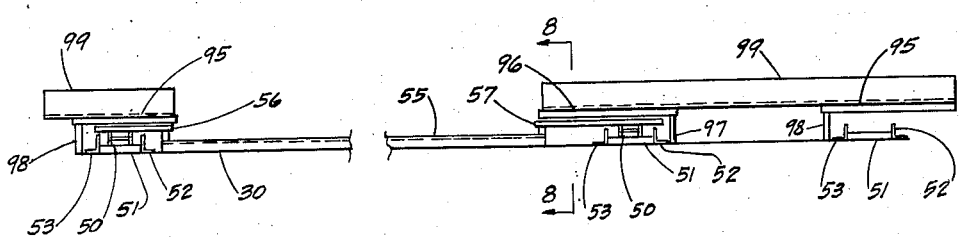
Figure 7 is a section on line 7—7 of Figure 5.

Referring now to Figures 1–7, and particularly first to Figures 5 and 7, each conveyor 17 comprises a pair of continuous chains 50 travelling over the top of floor 30 in guide channels formed by pads 51 and angle 52, 53. As best shown in Figure 6, there are a plurality of drag bars 55 disposed transverse to the chain and connected thereto at intervals of eight feet by means of end plates 56, 57 and gussets 58. As shown in Figure 8, each drag bar comprises a slide plate 60 with an angle beam 61 welded on top to provide a wedge having a forwardly directed angle of approximately 30 degrees.

As best shown in Figures 4 and 5, the conveyor chains 50 carry the drag bars 55 up the sloping floor 30, through the openings 19 at the front of the bin. The chains and bars then drop down beneath the floor hanging freely until they return to the floor at the rear of the bin where they enter through openings 63. As they enter the rear of the bin the chains pass over tail sprockets 64 on idler shafts 65. As they leave the front of the bin the chains pass over sprockets 66 on drive shafts 67.

Referring now to Figure 9 there is a separate drive shaft 67 for each of the conveyors 17. In addition to two head sprockets 66 there is a drive sprocket 68 on each drive shaft 67. Drive sprockets 68 are connected by chains 69 to sprockets 70 on spiral jaw clutches 71 by which the sprockets 70 can be selectively coupled to live shafts 72, 73. Live shafts 72, 73 are driven by electric gear motors 74, 75, through sprockets 76, 77, chains 78, 79, and sprockets 80, 81. Clutches 71 are actuated by electromagnetic solenoids not shown in Figure 9 but which will be discussed further later in connection with Figure 10.

Referring once again to Figure 5, there are guide plates 90 of J cross section at the front end of each conveyor 17. Each guide plate is connected at its flat edge with the bin floor. The forward portion curves downwardly concentric with drive shaft 67, the drag bars passing over it, and the chains 50 passing by it at each end as the conveyor moves. A raised portion 91 provides a housing over each drive sprocket 68. It is because of the extra width needed to accommodate these drive sprockets and their housings that the plates 57 (see Figure 7) connecting one of each pair of the chains 50 with the drag bars 55 is longer than the plate 56 at the other side.

Referring now to Figure 7 again, to prevent material from accumulating in the guide channels for chains 50 and in the links of the chains themselves, the guide channels are provided with covers 95, 96 in the form of plates supported on side walls 97, 98 and braced by angle beams 99 extending across the tops of the plates at intervals.

Figure 10:
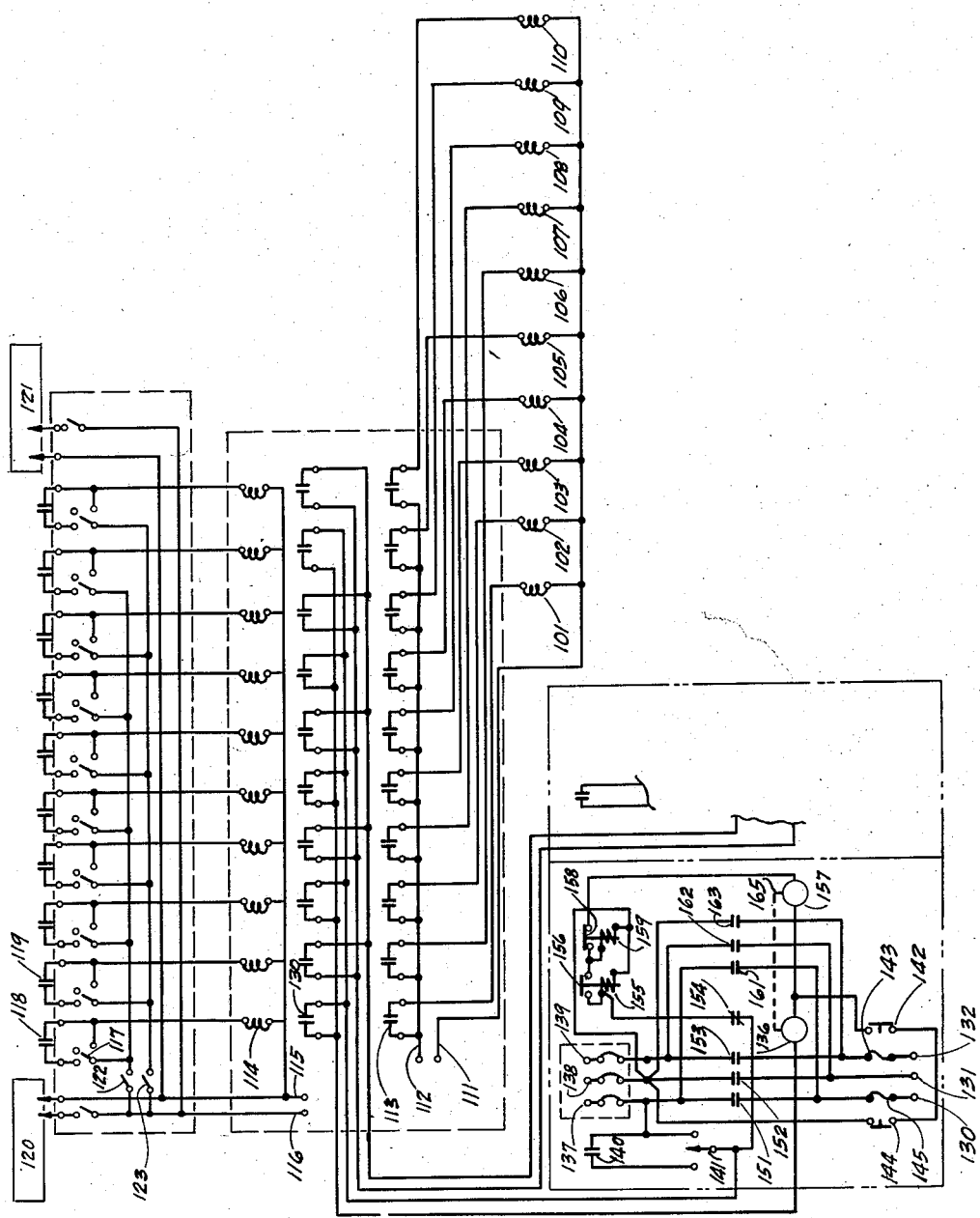
Figure 10 is a wiring diagram of the apparatus for controlling the floor conveyor drive mechanism.

Referring to Figure 10 there are shown solenoids 101–110 for actuating the spiral jaw clutches 71. These solenoids are energized from a suitable source of power not shown connected to lines 111, 112. Connection of the solenoids to line 112 is controlled by a set of relays each having lower contacts such as 113 for solenoid 101. These contacts are opened and closed by relays such as 114 for contacts 113. The relays are in turn energized from a source of power not shown, connected to lines 115, 116. Connections of the relays to line 116 is controlled either manually by switches such as 117 or automatically by contacts such as 118, 119, actuated by suitable timers 120, 121. Timers 120, 121 are preferably of the adjustable variable time type in which the length of time any one set of contacts is open or closed during each cycle can be varied as desired. Two timers are shown so that if desired only one at a time can be actuated causing only five out of the ten conveyors of the fuel vault to be operated. To render either timer ineffective to actuate the five solenoids under its control, it is only necessary to open one of the two switches 122, 123.

The relays, such as 114, each have an upper set of contacts, such as 130 in addition to lower contacts such as 113. The upper contacts control the drive motors 74, 75, one of which will be connected to lines 131, 132, 133 and the other to a similar set of lines coming from the right hand side of the motor control panel which has not been fully shown because it is a duplicate of the left hand side.

When one of the upper sets of contacts such as 130 closes it energizes coil 136 from a source of power, not shown, connected to lines 137, 138, 139, the circuit extending from line 137 through safety interlock contacts 140, which may be closed only when the fuel vault access door is closed for example, and/or through manual switch 141, thence to contacts 130, coil 136, contacts 142 of overload relay 143, contacts 144 of overload relay 145, to line 138.

When coil 136 is energized it closes contacts 151, 152, 153, which energizes motor 74 in a forward direction. At the same time one of the solenoids, e.g. 101 is energized to engage one of the clutches 71 to drive one of the conveyors 17.

When contacts 130 open, contacts 151, 152, 153, open and the motor 74 stops. At the same time normally closed contacts 154, actuated by coil 136, are closed to energize time delay relay 155 which, after a few seconds or fraction thereof, closes contacts 156 to energize coil 157 through normally closed contacts 158 of a second time delay relay 159.

When coil 157 is energized it closes contacts 161, 162, 163 to drive the motor 74 backwards. However, simultaneous with the energization of coil 157, the second time delay relay 159 is also energized and contacts 158 open shortly thereafter to open the circuit to coil 157 and bring the motor to rest again.

The reason for the brief reversal of the motors 74, 75 after stopping is to free the spiral jaw clutches 71 so they can be easily disengaged by the solenoids 101—100. Coils 136 and 137 are mechanically interlocked as indicated at 165 to insure that there is no simultaneous application of forward and reverse power to the motors.

Figure 11:
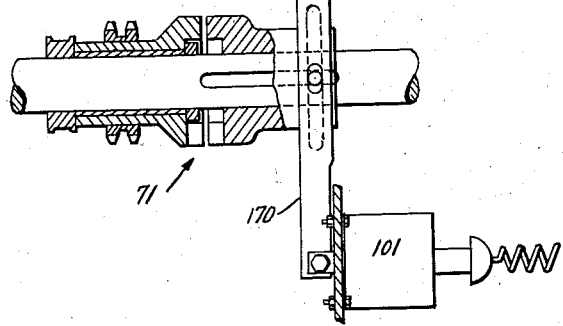
Figure 11 is a detail of a clutch and actuator used in the fuel vault.

Figure 11 shows the details of one of the spiral jaw clutches 71 and its associated solenoid actuator, e.g. solenoid 101, with the shifting lever 170 connected therebetween. It is believed that this arrangement, coupled with the motor control circuit, previously described, which reverses each conveyor briefly after it has stopped, provides a more economical and reliable arrangement than the provision of more powerful clutch actuators that could function without freeing of the clutches by reversal, and that the arrangement is much more economical than the provision of an individual drive motor for each conveyor.

With the controls for the conveyors previously described the conveyors are preferably caused to operate one at a time in a sequence such as 1, 6, 2, 5, 3, 8, 4, 7, 5, 10, the numbers referring to the several conveyors 17 consecutively from one end of the fuel vault to the other, with only one conveyor at a time operating. However any other sequence can be employed, the starting or stopping of one conveyor can overlap the operating period of another conveyor and more than one conveyor at a time can be operated, or even all conveyors at once, as desired. However, the preferred sequence gives a maximum time for gravity to refill each tunnel if such is formed, over each conveyor, before the conveyor is reoperated, and the conveyors at both sides of a given conveyor will be actuated once each cycle to break down the support for any tunnel formed over the particular conveyor. Also, no part of the pile will go along undisturbed so that there is reduced opportunity for the pile to integrate.

While a preferred embodiment of the invention has been shown and described, many modifications thereof can ge made by one skilled in the art without departing from the spirit of the invention and it is desired to protect by Letters Patent all forms of the invention falling within the scope of the following claims.

We claim:

1. Material transfer and storage apparatus comprising a bin having a floor sloping upwardly toward the front thereof and means for conveying material that is resting on said floor along said floor of the bin to discharge through opening means in the front wall of the bin, whereby the tendency of the conveyor means to move a pile of material in the bin toward the front wall is counteracted by the tendency of gravity to cause the pile to move down the sloping floor away from the front wall, said conveying means including a plurality of conveyors operating side by side and means for selectively operating each conveyor as desired, whereby the tendency of material to bridge over a single conveyor is counteracted by the action of adjacent conveyors to remove the side supports for the bridging material.

2. The combination of claim 1 in which there are a plurality of spiral jaw clutches engageable to drive the conveyors from drive shaft means, an electric solenoid means for engaging and disengaging each clutch, electric motor means connected to the drive shaft means, and automatic control means for stopping and momentarily reversing the motor means whenever one of said solenoid means is actuated to disengage the corresponding clutch.

3. The combination of claim 1 with means to deliver material to the bin including a shuttle conveyor means disposed transverse to the floor conveyors to distribute material uniformly over the full length of the bin transverse to the floor conveyors whereby all floor conveyors are equally loaded and excessive consolidation of material piled in the middle of the bin is avoided.

4. The combination of claim 1 in which each conveyor includes a plurality of drag bars of forwardly directed wedge shaped cross section, and drive means to cause the drag bars to move along the bin floor toward the front of the bin, whereby a pile of material consolidated in the bin can be lifted and broken up by forward motion of the drag bars without imposing undue load on the drive means.

5. The combination of claim 4 in which the drive means includes a pair of continuous chains to which the drag bars are connected at each end, and means enclosing the chains on all sides within the bin except where the drag bars are connected, whereby the pile of material in the bin is excluded from bearing directly down on the chains and contact therewith is reduced.

6. The combination of claim 5 in which each chain passes under the floor hanging freely whereby any material entrained therewith in its passage through the bin is given an opportunity to drop out.

7. Material transfer and storage apparatus comprising a bin having a floor sloping upwardly toward the front thereof, means for conveying material that is resting on said floor along said floor of the bin to discharge through opening means in the front wall of the bin, whereby the tendency of the conveyor means to move a pile of material in the bin toward the front wall is counteracted by the tendency of gravity to cause the pile to move down the sloping floor away from the front wall, and means disposed over the bin floor near but spaced from the front wall of the bin to deflect upwardly any forwardly moving material and to direct rearwardly any downwardly moving material before it reaches the front wall, said deflecting means including a plurality of horizontally and vertically spaced baffles spaced above the bin floor, each baffle being inclined upwardly toward the front of the bin.

8. Material transfer and storage apparatus comprising a bin having opening means in a wall thereof, a floor sloping upwardly toward said opening means, said floor having opening means therein extending from the opening means in the bin wall downwardly toward the opposite wall of the bin, and means for conveying material that is resting on and in contact with said bin floor upwardly along said floor of the bin to discharge through said opening means in the bin wall, said conveying means including endless drive means disposed with its upper course in said opening means in the floor, and a plurality of drag bars each connected to said endless drive means extending transversely therefrom over said bin floor.

9. The combination of claim 8 in which guide and support means is disposed at the opening means in the bin wall forming an extension of the bin floor out through said opening means in the bin wall and beyond the exterior of the bin wall and said conveyor means includes said endless drive means and said drag bars extend over said guide and support means to maintain positive flow of material through and past said opening means in the bin wall when the conveyor means is in operation.

10. The combination of claim 8 in which said drag bars are of wedge shaped cross section pointing in the direction of conveyor travel whereby a pile of material consolidated in the bin can be lifted and broken by forward motion of the drag bars.

References Cited in the file of this patent

UNITED STATES PATENTS

| | | |
|---|---|---|
| 716,769 | Seaver | Dec. 23, 1902 |
| 1,103,333 | Weeks | July 14, 1914 |
| 1,535,039 | Rettler | Apr. 21, 1925 |
| 2,277,416 | Rutten | Mar. 24, 1942 |